US006704414B2

(12) United States Patent
Murakoshi

(10) Patent No.: US 6,704,414 B2
(45) Date of Patent: Mar. 9, 2004

(54) TELEPHONE LINE EXTENSION

(75) Inventor: Susumu Murakoshi, Kowloon (HK)

(73) Assignee: Gemini Industries, Inc., Clifton, NJ (US)

( * ) Notice: Subject to any disclaimer, the term of this patent is extended or adjusted under 35 U.S.C. 154(b) by 48 days.

(21) Appl. No.: 09/860,135

(22) Filed: May 17, 2001

(65) Prior Publication Data

US 2002/0181696 A1 Dec. 5, 2002

(51) Int. Cl.[7] .............................................. H04M 1/00
(52) U.S. Cl. ...................................... 379/400; 379/391
(58) Field of Search ........................... 379/398, 399.01, 379/391, 400

(56) References Cited

U.S. PATENT DOCUMENTS

| 3,280,259 | A |   | 10/1966 | Cotter |
|---|---|---|---|---|
| 3,876,984 | A |   | 4/1975 | Chertok |
| 3,949,172 | A |   | 4/1976 | Brown et al. |
| 4,058,678 | A |   | 11/1977 | Dunn et al. |
| 4,475,193 | A | * | 10/1984 | Brown ................. 379/202.01 |
| 4,479,033 | A |   | 10/1984 | Brown et al. |
| 4,495,386 | A |   | 1/1985 | Brown et al. |
| 4,514,594 | A |   | 4/1985 | Brown et al. |
| 4,636,771 | A |   | 1/1987 | Ochs |
| 4,701,945 | A |   | 10/1987 | Pedigo |
| 4,866,757 | A |   | 9/1989 | Nilssen |
| 4,899,372 | A |   | 2/1990 | Wahi et al. |
| 5,051,720 | A |   | 9/1991 | Kittirutsunetorn |
| 5,066,939 | A |   | 11/1991 | Mansfield, Jr. |
| 5,068,890 | A |   | 11/1991 | Nilssen |
| 5,070,522 | A |   | 12/1991 | Nilssen |
| 5,210,788 | A |   | 5/1993 | Nilssen |
| 5,319,634 | A | * | 6/1994 | Bartholomew et al. ..... 370/436 |
| 5,333,190 | A |   | 7/1994 | Eyster |
| 5,530,737 | A |   | 6/1996 | Bartholomew et al. |
| 5,705,974 | A |   | 1/1998 | Patel et al. |
| 5,708,701 | A |   | 1/1998 | Houvig et al. |
| 5,745,552 | A |   | 4/1998 | Chambers et al. |
| 5,852,785 | A |   | 12/1998 | Bartholomew et al. |
| 5,937,342 | A |   | 8/1999 | Kline |
| 5,994,998 | A |   | 11/1999 | Fisher et al. |

* cited by examiner

*Primary Examiner*—Minsun Oh Harvey
*Assistant Examiner*—Jefferey Harold
(74) *Attorney, Agent, or Firm*—Skadden, Arps, Slate Meagher & Flom LLP

(57) ABSTRACT

A system comprising a base unit and a remote unit for transmitting telephonic data on AC power lines is disclosed. The base unit includes a transmitter section, a receiver section, a power line interface, a telephone line interface, a power supply, and a first microcontroller. The telephone line interface is coupled to a telephone line to apply the telephonic data signals to and receive signals from the telephone line. The telephone line interface has a ring detector, a muting circuit, and a hook switch. The transmitter is coupled to the telephone line interface and the power line interface. The transmitter has a modulator, an oscillator, an amplifier, and a filter. The receiver is coupled the telephone interface and the power line interface. The receiver has a filter, an amplifier, and a detector. The remote unit includes a transmitter section, a receiver section, a power line interface, a telephone interface, a power supply, and a second microcontroller. The telephone interface is coupled to a piece of telephone equipment to transmit the telephonic data signals to and receive signals from said telephone equipment. The telephone interface has a ring generator, a muting circuit, a tone generator, and an off-hook detector. The transmitter is coupled to the telephone interface and the power line interface. The transmitter has a modulator, an oscillator, an amplifier, and a filter. The receiver is coupled the telephone interface and the power line interface. The receiver has a filter, an amplifier, and a detector. The power supply provides at least one power output capable of powering a ringer circuit in the telephone equipment.

2 Claims, 17 Drawing Sheets

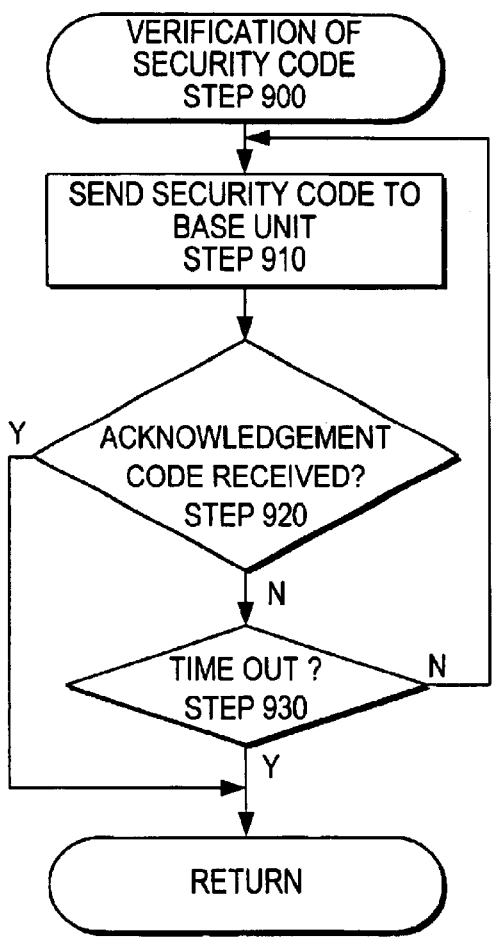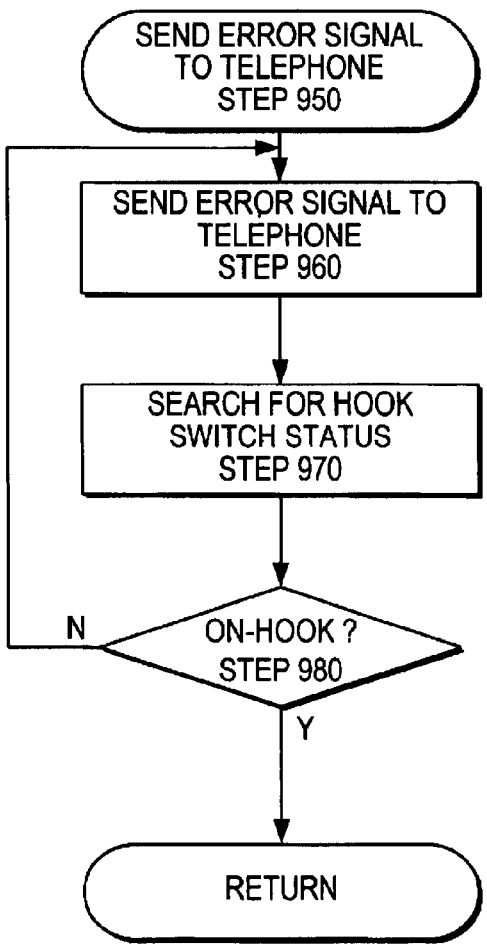
*FIG. 17*     *FIG. 18*

US 6,704,414 B2

TELEPHONE LINE EXTENSION

FIELD OF THE INVENTION

The present invention relates to telephony, and more particularly transmitting telephone signals over power lines.

BACKGROUND OF THE INVENTION

During the construction of commercial and residential buildings, wiring may be provided for both AC power and telephone outlets at various locations throughout the building. While it is comparatively easy to plan such outlets during the construction of a building, each outlet adds to the cost of the building. While existing buildings often include AC power outlets in a sufficient number of locations, it is often desired to add telephone outlets adjacent such power outlets. For existing buildings, the expenses of adding such telephone outlets are compounded. Sometimes it is very difficult or impossible to provide concealed wiring to a desired location for an outlet.

Thus, there is a need for a way to easily provide telephone outlets at desired locations in a building for telephone and other wired communications usage.

BRIEF SUMMARY OF THE INVENTION

A system for transmitting telephonic data on AC power lines comprising a base unit and a remote unit is disclosed. The base unit includes a transmitter, a receiver, a power line interface, a telephone line interface, a power supply, and a microcontroller. The telephone line interface is coupled to a telephone line to apply the telephonic signals to and receive telephonic signals from the telephone line. The telephone line interface has a ring detector, a muting circuit, and a hook switch. The transmitter is coupled to the telephone line interface and the power line interface. The transmitter has a modulator, an oscillator, an amplifier, and a filter. The receiver is coupled the telephone line interface and the power line interface. The receiver has a filter, an amplifier, and a detector.

The remote unit includes a transmitter, a receiver, a power line interface, a telephone line interface, a power supply, and a second microcontroller. The telephone line interface is coupled to a piece of telephone equipment to transmit the telephonic data signals to and receive signals from said telephone equipment. The telephone line interface has a ring generator, a muting circuit, a tone generator, and an off-hook detector. The transmitter is coupled to the telephone line interface and the power line interface. The transmitter has a modulator, an oscillator, an amplifier, and a filter. The receiver is coupled the telephone line interface and the power line interface. The receiver has a filter, an amplifier, and a detector. The remote unit's power supply provides at least one power output capable of powering a ringer circuit in the telephone equipment.

BRIEF DESCRIPTION OF THE DRAWINGS

FIG. 17 is a flowchart of a process for code verification; and

FIG. 18 is a flowchart of a process for sending an error message.

DETAILED DESCRIPTION OF THE INVENTION

Figure 1:
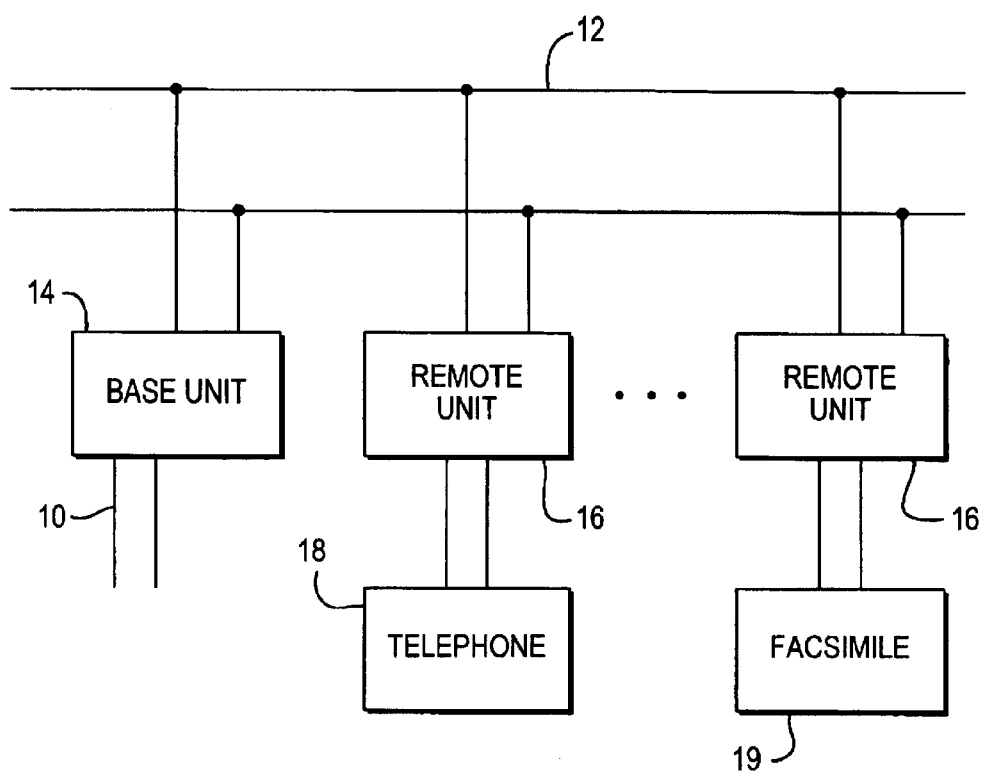
FIG. 1 is a block diagram of a system for transmitting telephonic information over AC power lines.

FIG. 1 is a block diagram showing one embodiment of the present invention. The disclosed system is used to couple a telephone line 10 to an AC power line 12. The telephone line 10 is coupled to the AC power line 12 using base unit 14. Also connected to the AC power line 12 are remote units 16. Remote units 16 are used to connect telephone equipment such as telephones 18, facsimile machines 19, modems, or the like, to the telephone line 10 through the base unit 14 and remote unit 16. Any number of remote units 16 may be connected to the AC power lines 12. In one embodiment of the invention, the remote units 16 are associated with base unit 14 without any priority. The remote units 16 connect to base unit 14 on a first come, first serve basis. Once a remote unit 16 connects to base unit 14, all other remote units receive a busy tone.

Communication between base unit 14 and remote units 16 is accomplished using radio frequency (RF) signals propagated through the AC power line 12. In one embodiment, the RF signals are between 1.8 MHz and 8.5 MHz. The data transmitted between telephone line 10 and telephone equipment 18, is accomplished by transmitting RF signals between the base unit 14 and remote units 16 using the AC power line 12 as the propagating medium. In one embodiment, the base unit transmits to the remote units at a first frequency, such as 1.8 to 2 MHz, while the remote unit transmits to the base unit at a second frequency, such as 4–8.5 MHz. In one embodiment, narrow band FM modulation is used for all of the transmitted signals including voice, DTMF, modem, and the like. Other modulation techniques such as spread spectrum, phase shift modulation, code domain modulation, and the like, can also be used. To avoid unauthorized use of the telephone line 10, base unit 14 and remote units 16 utilize security codes for validation. In one embodiment of the invention, an 8-bit security code is used. In another embodiment, users enter pre-defined authorization codes to access telephone line 10. Other security codes may also be used, such as 32-bit security codes, randomly generated security codes, security code algorithms, and the like.

Figure 2:
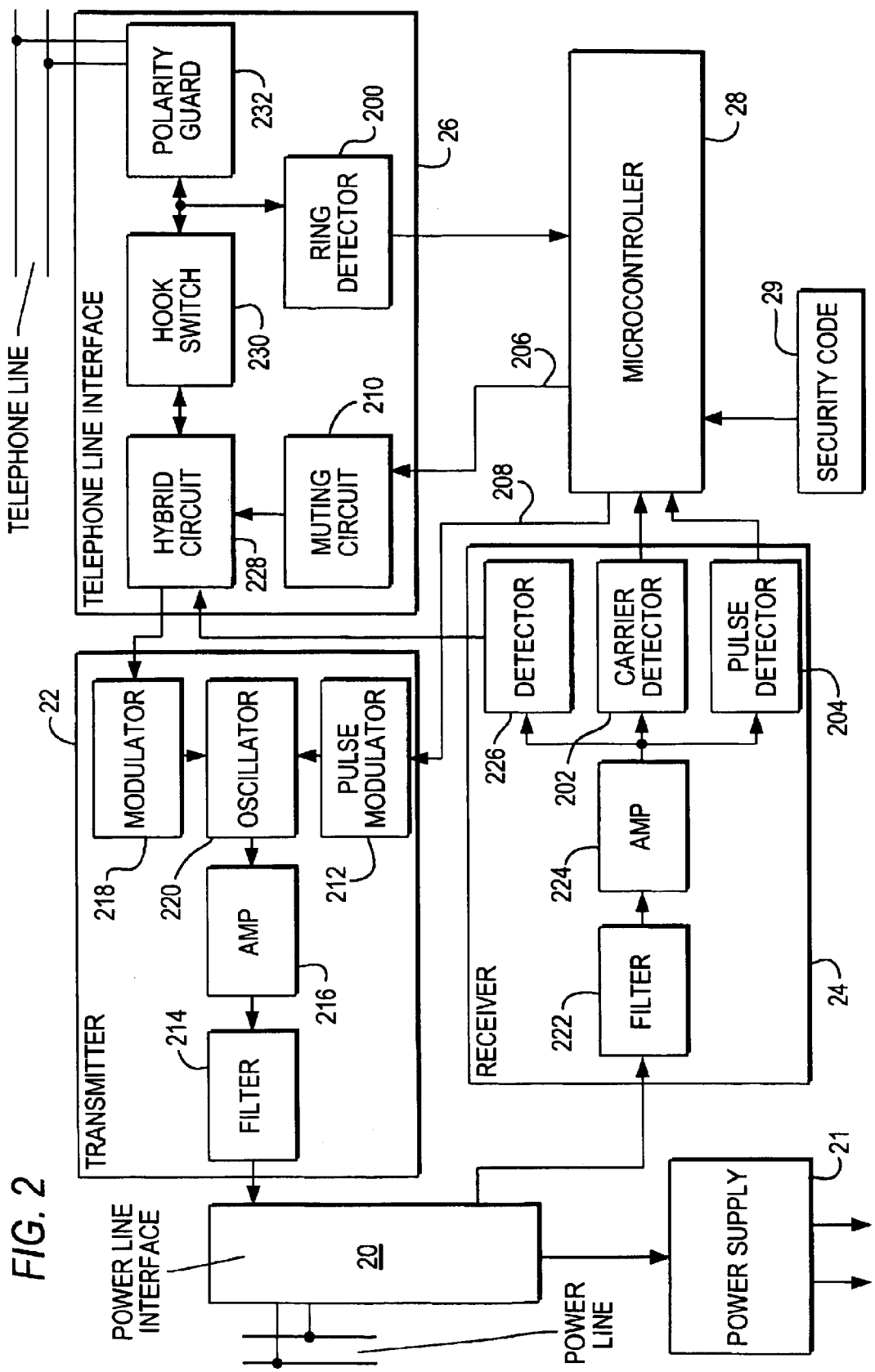
FIG. 2 is a block diagram of a base unit.

FIG. 2 is a block diagram of a base unit 14. In one embodiment of the invention, base unit 14 includes power line interface 20, power supply 21, transmitter 22, receiver 24, telephone line interface 26, microcontroller 28, and security code generator 29. In one embodiment of the invention, transmitter 22 operates at 1.8–2 MHz while receiver 24 operates at 4–8.5 MHz. In one embodiment of the invention, power line interface 20 provides a power output for power supply 21 as well as coupling transmitter 22 and receiver 24 to AC power line 12. Power supply 21 provides a 5-volt and 12 volt power supply to the various components, which make up base unit 14. Microcontroller 28 controls the operation of the base unit 14. Receiver 24, transmitter 22, and telephone line interface 26 are connected to microcontroller 28. Additionally, in one embodiment of the invention, security code generator 29 is connected to microcontroller 28. The inputs to the microcontroller 28 include ring detector 200, carrier detector 202, and pulse detector 204. The outputs from microcontroller 28 include control lines 206 and 208, which control muting circuit 210, and pulse modulator 212, respectively. In one embodiment of the invention, transmitter 22 is comprised of filter 214, amplifier 216, oscillator 220, modulator 218, and pulse modulator 212. In one embodiment of the invention, filter 214 is a band pass filter designed to allow the 1.8–2 MHz band to pass. Likewise, amplifier 216 is a 1.8–2 MHz amplifier. Modulator 218 is an FM modulator, which modulates the data signal from telephone line 10 received from telephone line interface 26.

Receiver 24 receives its input from power line interface 20. In one embodiment of the invention, receiver 24 operates at 4–8.5 MHz. Filter 222 receives a signal from power line interface 20, which contains data from remote units 16. In one embodiment of the invention, filter 222 is a band pass filter designed to pass signals centered around 4–8.5 MHz. Amplifier 224 then amplifies the signal. The output of amplifier 224 is fed to detector 226, carrier detector 202, and pulse detector 204. In one embodiment of the invention, detector 226 is an FM detector. The output of detector 226 is fed to telephone line interface 26.

Telephone line 10 is connected to transmitter 22 and receiver 24 through telephone line interface 26. In one embodiment of the invention, polarity guard 232 is coupled to telephone line 10. Polarity guard 232 is coupled to hook switch 230 and ring detector 200. Hook switch 230 is coupled to hybrid circuit 228, which outputs a data signal to modulator 218, and receives a data signal from detector 226. Hybrid circuit 228 also receives a signal from muting circuit 210. When ring detector 200 detects a signal indicative of a ring, a signal is output to microcontroller 28, notifying the system that a call is incoming.

Figure 3:
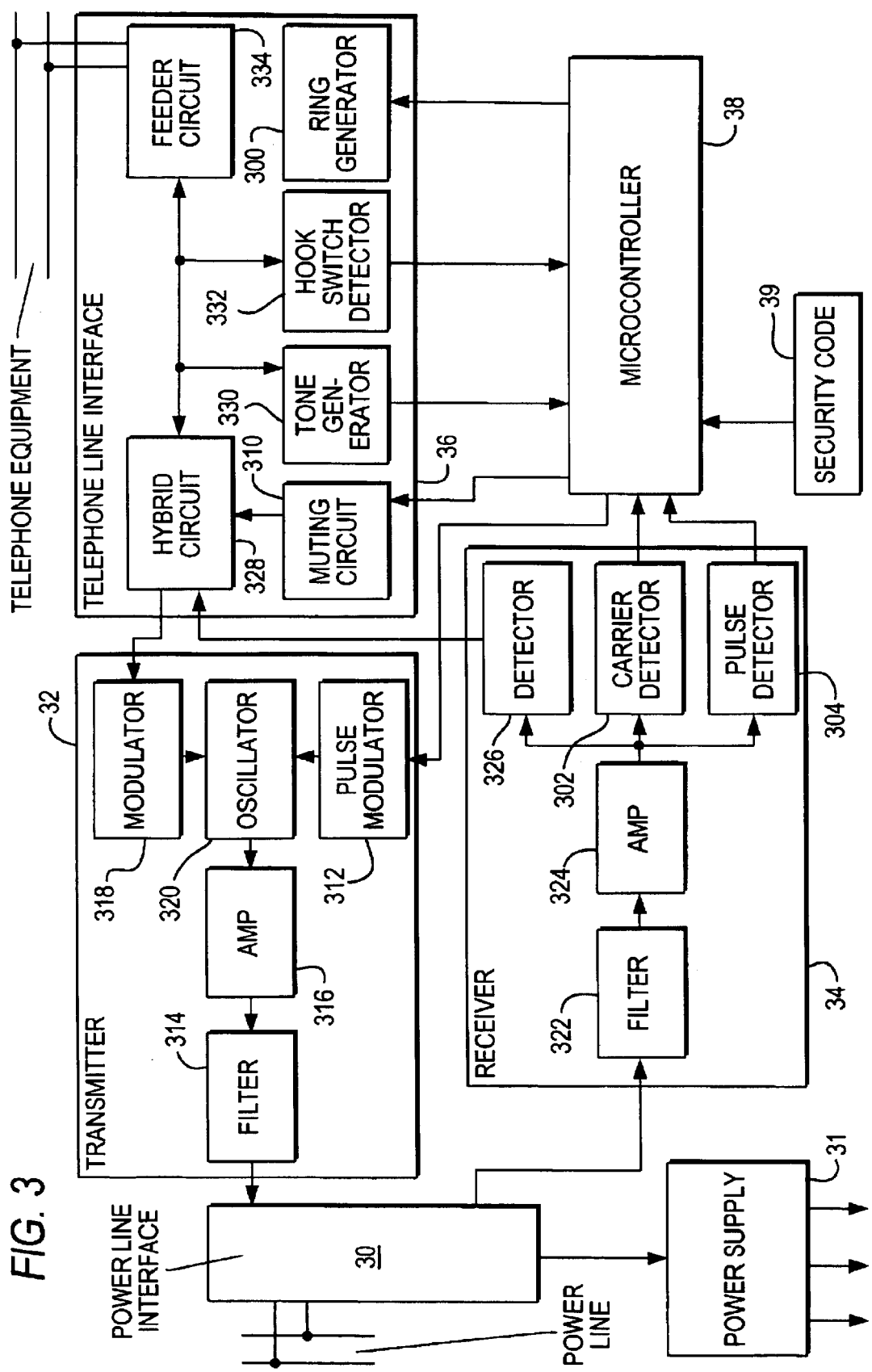
FIG. 3 is a block diagram of a remote unit.

FIG. 3 is a block diagram of remote unit 16. As shown, remote unit 16 is the interface between AC power line 12 and telephone equipment 18. Power line interface 30 connects AC power line 12 to transmitter 32, receiver 34, and power supply 31. Transmitter 32 is preferably a 4–8.5 MHz transmitter. Transmitter 32 transmits a signal received from telephone interface 36 to power line interface 30 for transmission via AC power line 12 to base unit 14. The data from telephone equipment 18, received by transmitter 32 from telephone interface 36, is first modulated by modulator 318 and then amplified by amplifier 316. The signal is filtered before transmission so that only the data is transmitted to base unit 14. In one embodiment of the invention, modulator 318 is an FM modulator.

Receiver 34 receives a signal transmitted from base unit 14. Receiver 34 is not connected directly to AC power line 12 but is connected through power line interface 30. Signals received by receiver 34 are filtered before processing. In one embodiment, filter 322 is a band pass filter. The signal output from filter 322 is fed to amplifier 324, whose output is distributed to detector 326, carrier detector 302, and pulse detector 304. In one embodiment of the invention, detector 326 is an FM detector. Outputs from carrier detector 302 and pulse detector 304 are presented to microcontroller 38 as inputs. Additionally, the output of FM detector 326 is presented to hybrid circuit 328, part of telephone interface 36.

Telephone interface 36 couples telephone equipment, such as telephone 18, to transmitter 32 and receiver 34. Additionally, telephone interface 36 presents microcontroller 38 with an off-hook signal via off-hook detector 332. Telephone interface 36 receives several inputs from microcontroller 38 including a ring generator control, tone generator control, and a signal that triggers muting circuit 310. Finally, microcontroller 38 receives a control code from security control module 39. In one embodiment, the security codes are generated by microcontroller 38. In another embodiment of the invention, users enter security codes, which are processed and verified by microcontroller 38. In yet another embodiment of the invention, a security code is processed using an algorithm, which is verified by microcontroller 38.

Figure 4:
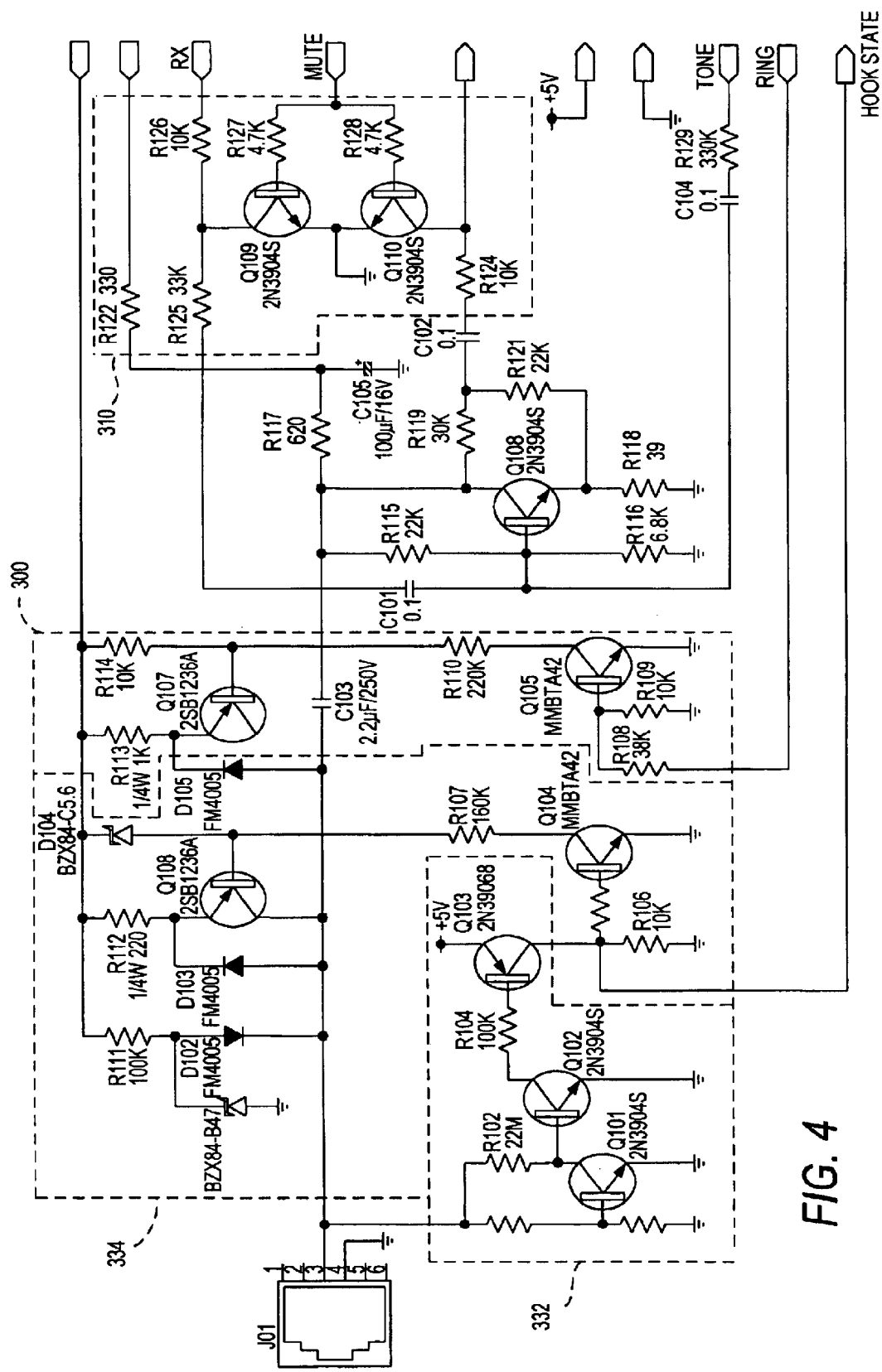
FIG. 4 is a schematic diagram of a telephone line interface.

FIG. 4 is a schematic diagram for a remote unit telephone interface (36, FIG. 3). While FIG. 4 shows one implementation of an interface circuit for the remote unit, other implementations are possible. The telephone equipment 18 connects to the telephone interface circuit at J101. DC feeding circuit 334 is made up of diodes 101–104, transistors Q104 and 106, and their associated biasing resistors. DC feeder circuit 334 supplies DC voltages and current to telephone equipment 18. When the telephone equipment is the on-hooked state, transistor Q106 is off and the current through resistor R111 and diode D102 is less than 10 microamps. Voltage regulator diode D101 regulates the supply voltage to approximately 48 volts. When the telephone equipment is in the off-hook state, hook switch detector circuit 332 detects the hook switch status and transistors Q104 and Q106 in DC feeding circuit 334 conduct. Transistor Q106 and diode D104 and their associated biasing resistors make up a constant current source with an output of approximately 25 milliamps. This circuit can be modified if a different current is required to operate the telephone equipment 18. In one embodiment of the invention, diode D103 will be part of the circuit, which will protect transistor Q106 from transient pulses generated by the telephone equipment.

Hook switch detector circuit 332 is implemented using Q101–Q103 and their associated biasing resistors. When telephone equipment 18 is in the off-hook state, the supply voltage for the telephone equipment is approximately 48 volts. To provide this 48-volt supply, transistor Q101 is turned on and Q102 and Q103 are turned off. In the on-hook state, the supply voltage for the telephone equipment is approximately 10 volts or lower. Therefore, Q101 is turned off and Q101 and 103 are turned on. In one embodiment of the invention, the threshold detection voltage is set to approximately 20 volts. A 20-volt threshold allows the hook switch detector circuit 332 to detect pulse signals, such as a dial pulse, a flash signal, and the like. The hook detect signal present at the collector of Q103 is fed to both microcontroller 38 and Q104 of the DC feeder circuit 334.

Ring generator 300 is implemented using Q105 and Q107 along with their associated biasing elements. Microcontroller 38 provides a simulated ringer signal to the base of transistor Q105. In a preferred embodiment, the simulated ringer signal is at a frequency of 20 Hz. Transistors Q105 and Q107 oscillate between on and off in response to the ringer signal generated by the microcontroller 38. Q105 and Q107 generate a ringer signal, which is approximately 100 volts peak to peak, or 30 volts rms. The 100-volt peak-to-peak ringer signal is provided to the telephone equipment 18. In a preferred embodiment, diode D105 protects transistor Q107 from transient pulses generated by telephone equipment 18.

In one embodiment of the invention, muting circuit 310 is implemented using transistors Q109 and Q110 along with their associated biasing components. Muting circuit 310 is activated when a muting signal is received from microcontroller 38. Muting circuit 310 is active, i.e., the voice signals are muted, during data communications between the remote and base unit.

Figure 5:
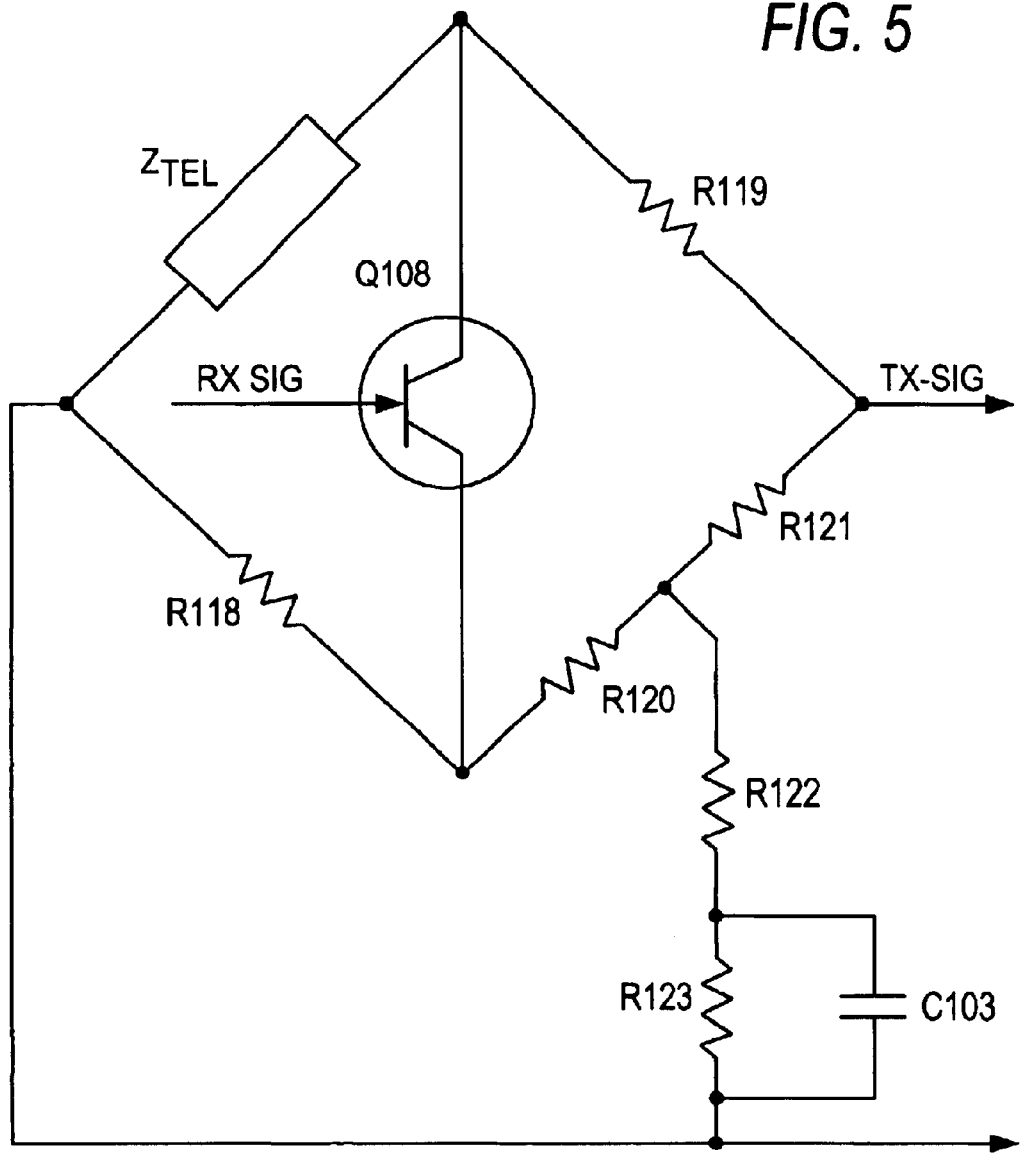
FIG. 5 is a schematic diagram of an anti-sidetone network.

Transistor Q108 and its associated components are an anti-side tone circuit. An anti-side tone circuit is also shown in FIG. 5. In one embodiment of the invention, $Z_{bal}$, made up from R122, R123, and C103, is used to compensate telephone line impedance. Telephone line impedance varies with the length of the cable between the remote device and the telephone equipment. In one embodiment of the invention, a selection switch is used to select the distance between the telephone equipment and the remote unit. Maximum circuit compensation is achieved when $Z_{tel}=$ (R118×R119)/(R120+R121). In one embodiment of the invention, variable capacitors and potentiometers are used for telephone line compensation.

Figure 6:
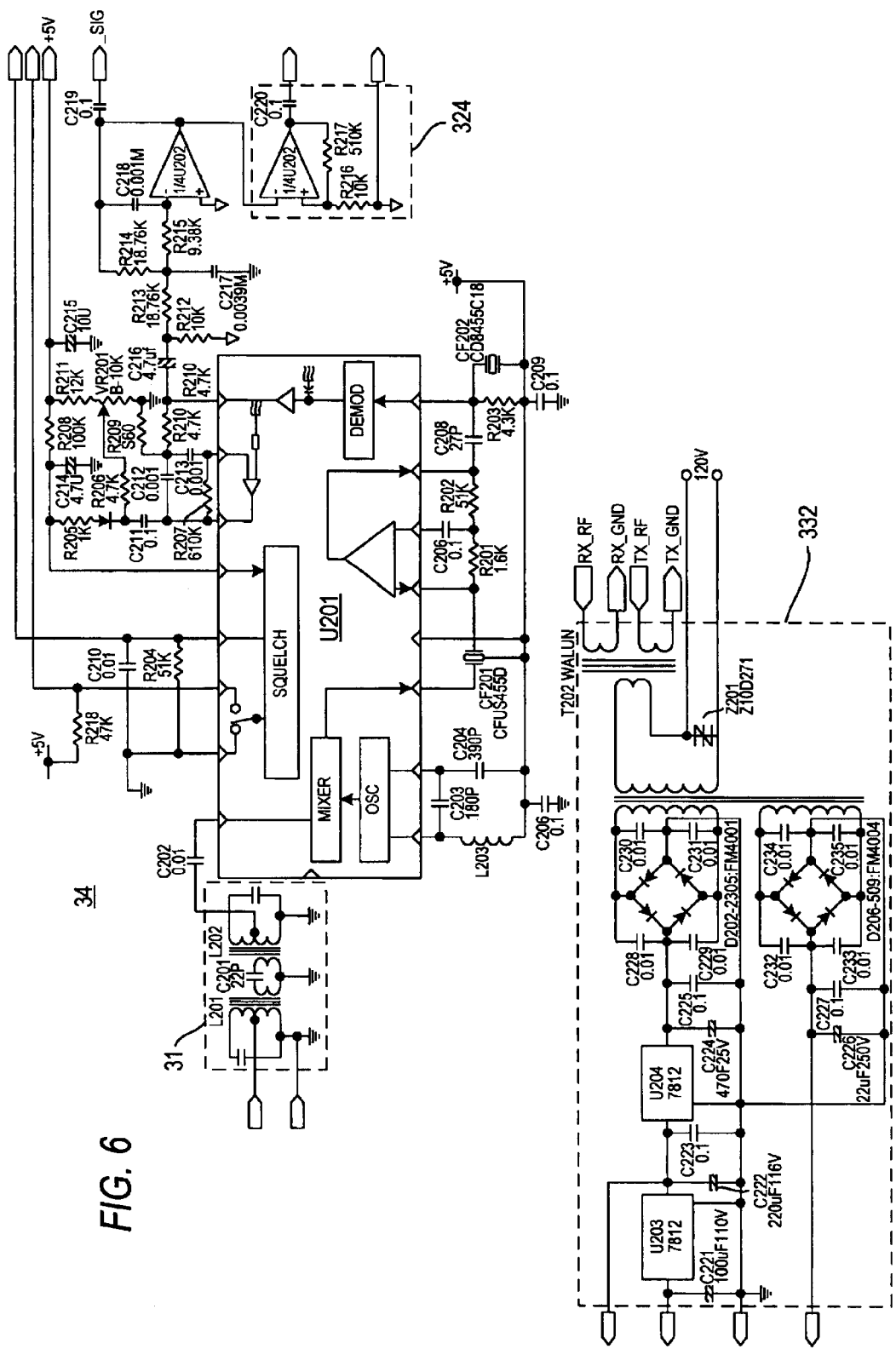
FIG. 6 is a schematic diagram of a receiver and power supply for a remote unit.

FIG. 6 is a schematic diagram showing one implementation of a receiver 34 and power supply 31 for a remote unit 16. In one embodiment of the invention, receiver 34 is implemented using an integrated circuit such as an MC3372 integrated circuit. The MC3372 is a low power narrow-band FM intermediate frequency integrated circuit manufactured by Motorola. Other low power narrow-band FM detector integrated circuits or FM dual conversion integrated circuits include the MC3361, MC3371, MC3357, LM3361, KA3361, and NJM3357. Other implementations of the receiver 34 include discreet component implementations, well known to one skilled in the art. The receiver circuitry includes an oscillator, a mixer, a squelch circuit, a limiter amplifier, a filter amplifier, an audio filter amplifier, and a demodulator. Band pass filter 322 is implemented with L201, L202, and C201. Band pass filter 322 minimizes electrical interference from other electrical devices. In one embodiment of the invention, DC blocking capacitor C202 is placed between the output of band pass filter 322 and the RF stage of U201. In one embodiment of the invention, the RF output from band pass filter 322 is presented to a mixer. The RF signal is mixed with a signal from a local oscillator. In a preferred embodiment of the invention, the local oscillator generates a frequency 455 kilohertz higher than the RF signal from the base unit. In one embodiment of the invention, L203, C203, and C204 are used to tune a local oscillator. In a preferred embodiment of the invention, ceramic capacitors with temperature compensation are used for C203 and C204 to compensate for oscillator frequency drift caused by changes in ambient temperature.

The output from the mixer is fed to an IF amplifier (Pin 5 of U201). In a preferred embodiment of the invention, the output of the mixer is processed using a ceramic filter such as CF201 to remove unnecessary frequency components of the IF signal thereby maximizing selectivity. The IF signal is then amplified and demodulated. In a preferred embodiment, ceramic discriminator CF202 is used. The ceramic discriminator allows the product to be used without tuning or alignment. When an integrated circuit such as U201 is used in place of discrete components, R201 and R202 are biasing resistors for the IF amplifier.

A low pass filter processes the demodulated signal. In a preferred embodiment, the filter cut-off frequency is 6 KHz and the slope is 12db per octave. The output of this filter is presented to clamp circuit 324. Clamp circuit 324 shapes the demodulated signal to control signals compatible with microcontroller 38. The demodulated signal is also presented to an amplifier. In one embodiment of the invention, the amplifier is a portion of U201. The amplified output is fed to a detector circuit to convert the signal to DC voltages. The DC voltage level varies depending on the noise level. The noise level is reduced when the input RF signal is sufficient and the DC level is increasing or going high. Conversely, the DC level, which serves as the input to the squelch circuit, will go low when insufficient RF signal levels are present or when there is no RF signal input to the circuit. The DC level directly controls the squelch circuit of U201. The absence of an input signal is indicated by the presence of noise above the desired audio frequencies. An active filter and detector monitor the noise band. A squelch switch is used to mute the audio when noise or a tone is present. In one embodiment of the invention, the threshold level can be adjusted using a potentiometer. A balun, T202, is used to interface the RF signals to the AC power line. In other embodiments of the invention, other elements can be used such as 90-degree hybrids, couplers, combiners, and the like. In a preferred embodiment of the invention, the RF signal level on the AC power lines is limited to comply with FCC rules part 15.

In general, receiver 34 takes the RF input from the power line, and processes it with band pass filter 322. This RF signal is converted using a mixer amplifier to an IF signal at 455 KHz. After processing the IF signal with a band pass filter the IF signal is fed to a limiting amplifier and detection circuit where the audio signal is recovered. In a preferred embodiment, a conventional quadrature detector is used.

In a preferred embodiment, the oscillator, which provides one of the inputs to the mixer, is a colpitts type oscillator. The colpitts oscillator can be tuned using inductors and capacitors. In one embodiment, a crystal is used to tune the oscillator.

Power supply 31 consists of power transformer T201, fixed voltage regulators U203, U204, and their associated components. U203 is a 7805 fixed voltage regulator, which provides a 5-volt output. U204 is a 7812 fixed voltage regulator, which provides a 12-volt output. T201 isolates the AC power line from the telephone lines as well as dropping down the voltages used to power the remote unit. T201 also provides a 150-volt DC voltage for the DC feeding circuit and the ringer circuit. In a preferred embodiment of the invention, the transmitter 32 is powered using the 12-volt DC power supply.

Figure 7:
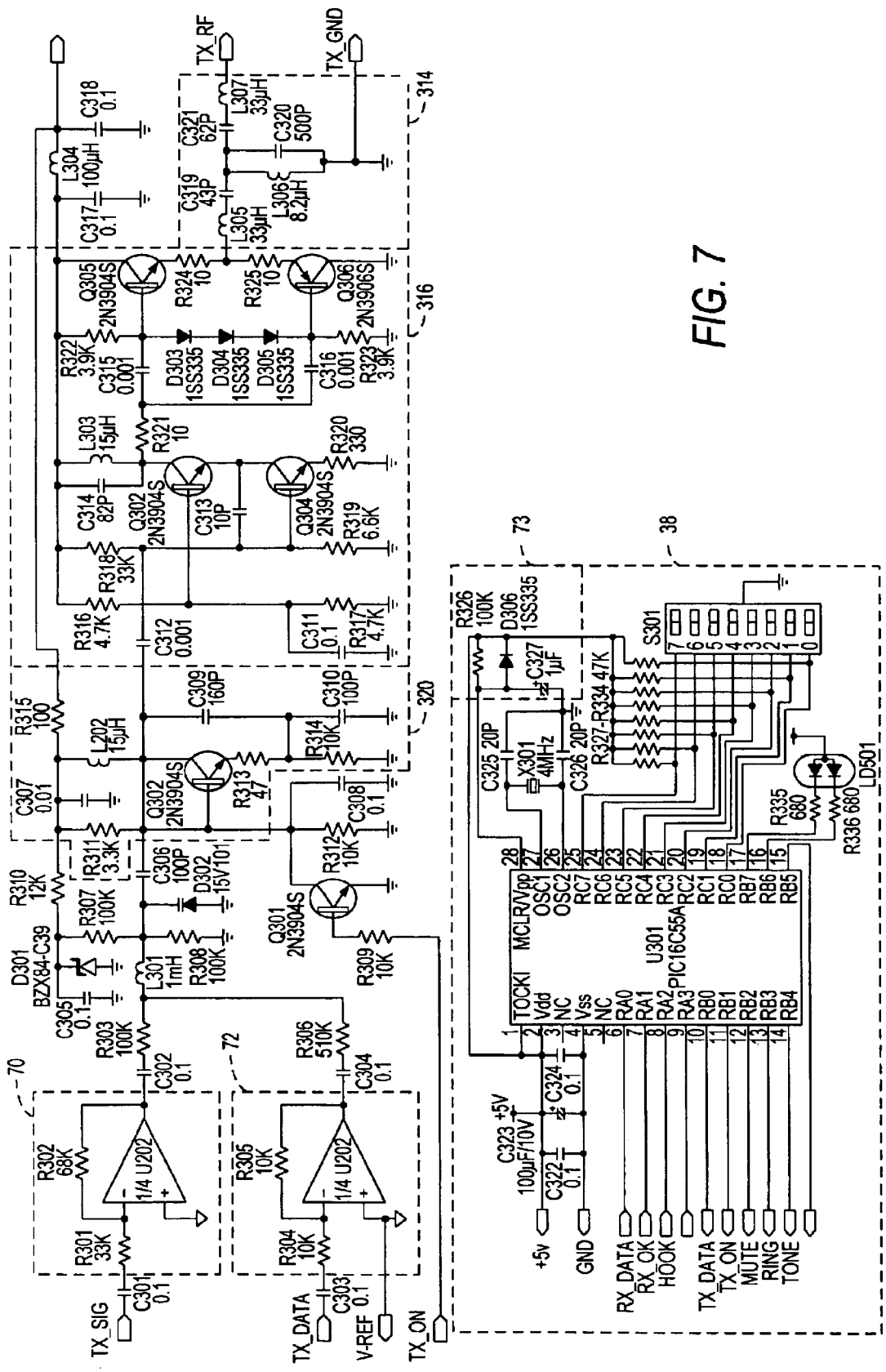
FIG. 7 is a schematic diagram of a transmitter and microprocessor for a remote unit.

FIG. 7 is a schematic diagram showing one embodiment of a transmitter and a microprocessor circuit. Transmitter circuit 32, as shown in FIG. 7, first amplifies the voice signal using signal amplifier 70 and the data signal using data amplifier 72. The data signal is a signal, which is generated by the microcontroller. The outputs of amplifiers 70 and 72 are at an amplitude suitable for the FM modulator circuit. In a preferred embodiment, maximum deviation for the voice signal is 3 KHz and the maximum deviation for the data signal is 4 KHz. The FM modulator 318 is composed of variable capacitance diode D302 and its associated biasing components. The variable capacitance diode D302 is connected to the RF oscillator circuit for FM modulation. In a preferred embodiment, diode D301 is used to stabilize the bias voltage for diode D302. Oscillator 320 is implemented using transistor Q302, variable inductor L302, and capacitors C309 and C310. The oscillator frequency is tuned using inductor L302 and capacitors C309 and C310. A DC blocking capacitor such as C306 connects variable capacitance diode C302 to the oscillator circuit. The oscillator frequency will vary according to the voice or data signal due to this configuration. In a preferred embodiment, to minimize frequency drift, ceramic capacitors will be used for C306, C309, and C310.

In one embodiment of the invention, amplifier 316 is implemented with a cascade amplifier. The first stage of cascade amplifier 316 is a common emitter amplifier and the second stage is a common base amplifier. This configuration allows for stable, high gain RF amplification. Transistors Q303 and Q304 comprise the first stage of the cascade amplifier and transistors Q305 and Q306 make up the RF power amplifier. Transistors Q303, Q304, Q305, and Q306 can be BJTs, FETs, or the like. In another embodiment of the invention, an integrated circuit amplifier may be used.

As shown in FIG. 7, band pass filter 314 is implement using inductors L305, L306, L307, and capacitors C319–C321. Band pass filter 314 is used to eliminate harmonic and spurious frequency components generated by the RF oscillator and the RF amplifiers. In one embodiment of the invention, this filter is used to comply with the FCC rules such as FCC rules part 15 for radio frequency transmission and radiation, and FCC rules part 68 for telephone equipment. In other embodiments of the invention, notch filters, band reject filters, or other types of filters are used in place of the band pass filter.

Microcontroller 38 is implemented using a PIC Micro Devices microcontroller such as the PIC16C55A or the like. The microcontroller is used as a system controller. The microcontroller 38 is programmed as discussed herein. In a preferred embodiment, a crystal resonator such as X301 is used to generate a 4 MHz clock frequency for microcontroller 38. The internal instruction cycle used with the microcontroller 38 is preferably one microsecond. A reset circuit 73 is used to initialize the microcontroller 38 in an initial state upon power-up. In one embodiment of the invention, an 8-pole DIP switch and pull up resistors are used for setting the security code. In another embodiment of the invention, a random number generator is used to set the security code. Microcontroller 38 is uses dual color LEDs D301 to indicate system status. LED 301 indicates the system status such that a first LED will be steadily on after power-on reset is complete and a second LED will be on steadily after successfully establishing a connection between the base unit and the remote unit. The first LED will be flashing at a rate of one flash per second when there has been an unsuccessful attempt to establish a connection between the base unit and the remote unit, and the second LED will be flashing at a rate of one flash per second when the base unit is in use by another remote unit.

Figure 8:
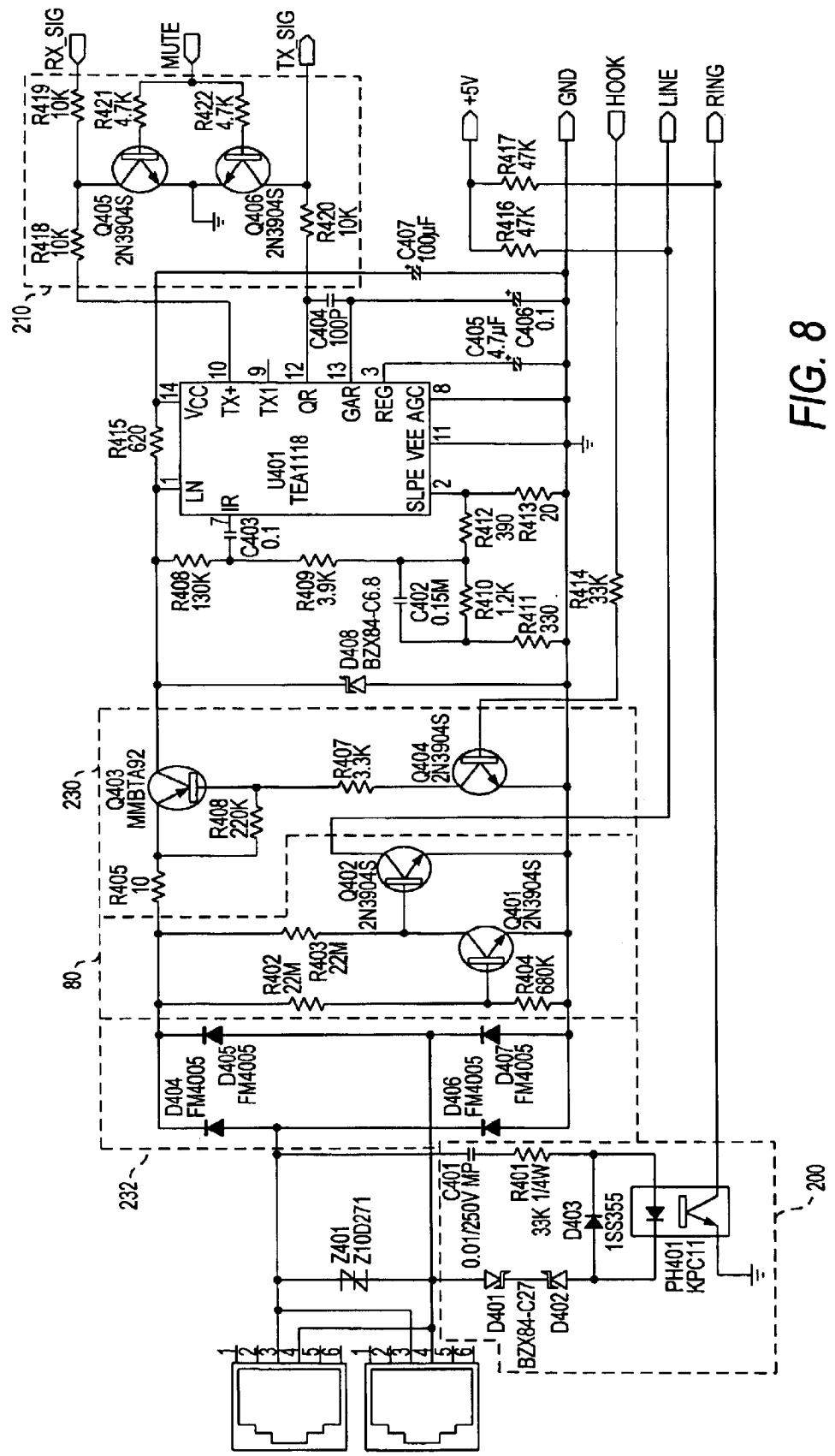
FIG. 8 is a schematic diagram of a telephone line interface for a base unit.

FIG. 8 is a schematic diagram of a telephone line interface for base unit 14. As shown in FIG. 8, J401 or J402 is used to connect the base unit to the telephone line. The two jacks are connected in parallel so that one jack is connected to the telephone line 10 while the other jack is connected to a piece of telephone equipment 18. A surge-absorbing device Z401 is connected across the telephone lines to protect the base unit from transients or surge voltages, such as lightning, etc. Ring detect circuit 200 is implemented using an optocoupler. The output of the optocoupler is fed to micro controller 28, which produces simulated ring signals. A metalized polyester capacitor C401 is used to isolate DC voltages on the telephone line. Zener diodes D401 and D402 are connected cathode-to-cathode, and are used to prevent unexpected triggering of the ringer detection circuit while the phone is in the on-hook or off-hook state, and when pulse dialing is implemented. In one embodiment of the invention, diode D403 protects the optocoupler from reverse voltage. Along with Z401, polarity guard 232 is used to protect the product from harmful voltages. Polarity guard 232 is used to protect the product from the reverse voltages, which are present on telephone lines. Transistors Q401 and Q402 are used to monitor the telephone line status. Q401 and Q402 and their associated biasing resistors make up hook switch detector 80. Hook switch detector 80 is used to monitor the telephone line status, whether other telephone equipment connected in parallel with this product is in used, or if other telephone equipment is in use. If other telephone equipment is in use, a busy tone will be sent to the remote unit.

Hook switch 230 is implement using Q403 and Q404 along with their associated biasing resistors. Hook switch 230 is also used for pulse dialing and to produce the flash signal, which accesses such services as call waiting and the like. Muting circuit 210 is implemented using transistors Q405 and Q406 along with their associated biasing resistors. Muting circuit 210 is used to mute the unit and the remote unit is taking place. In this manner, voice signals do not interfere with the transmission of security codes and the like.

The speech network for telephone line interface can be implemented using discrete components or an integrated circuit such as the TEA1118 manufactured by Philips Semiconductors. The speech network includes a current reference, a low voltage circuit, automatic gain control circuitry, anti-sidetone circuitry, and a receiving amplifier.

Figure 9:
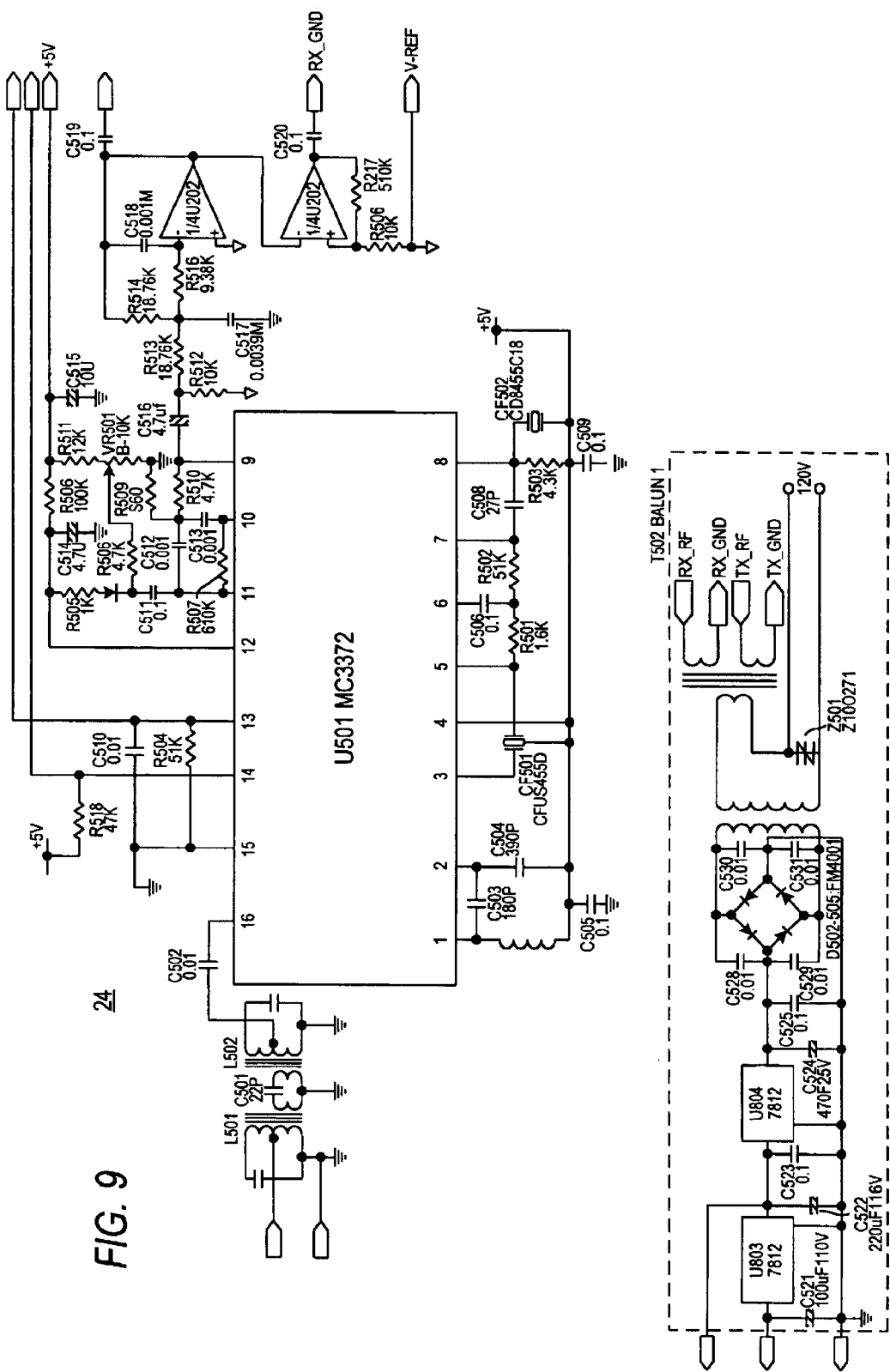
FIG. 9 is a schematic diagram of a base unit receiver and power supply.

FIG. 9 is a schematic diagram of base unit receiver 24 and power supply 21. Receiver circuitry 24 functions in a manner similar to receiver circuitry 34 discussed above with reference to FIG. 6. In one embodiment of the invention, receiver 24 operates at a different frequency than receiver 34. Additionally, power supply 21 does not provide a 150-volt supply, because the 150-volt supply is not required at the base unit.

Figure 10:
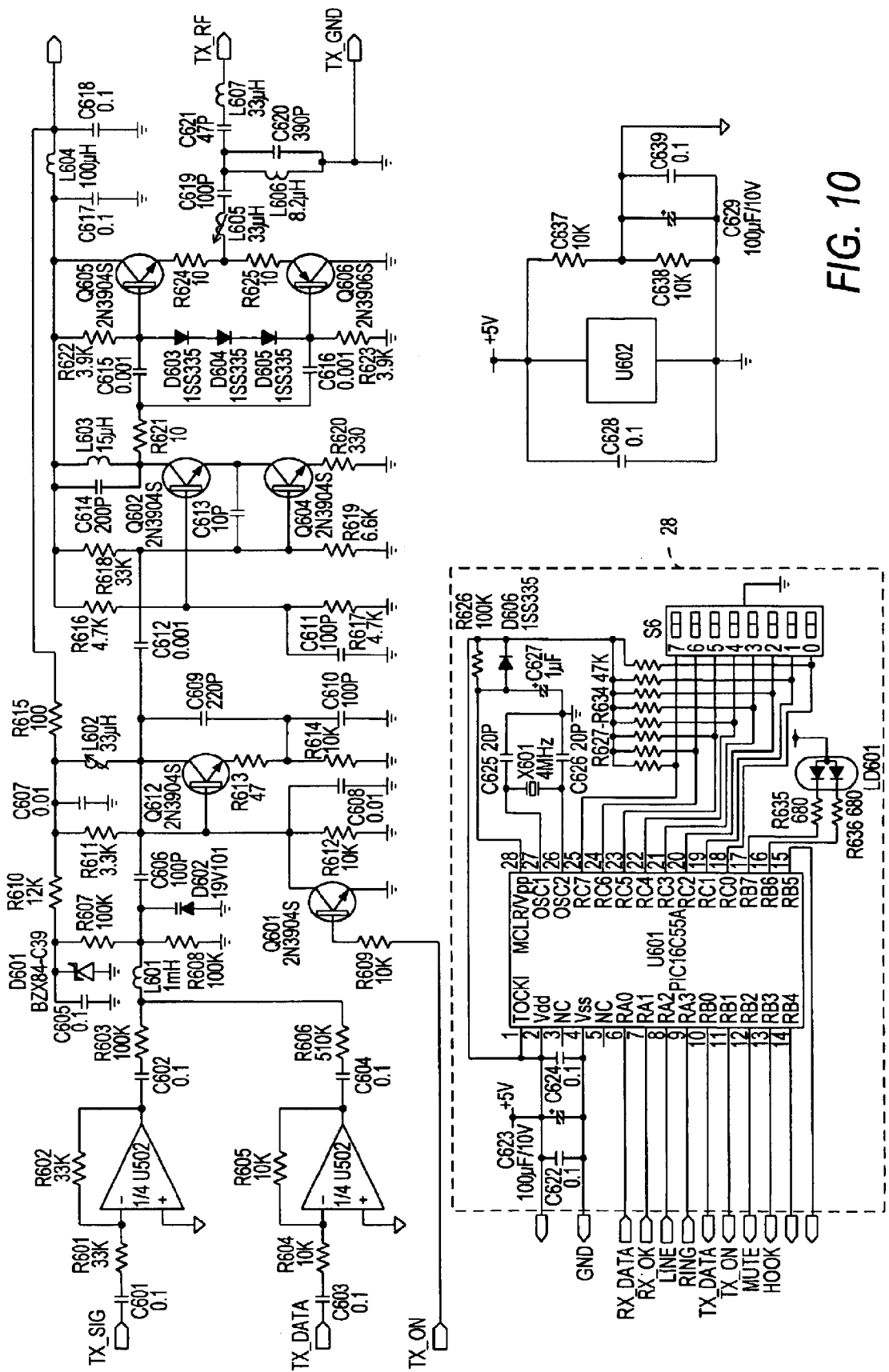
FIG. 10 is a schematic diagram of a transmitter and microprocessor for a base unit.

As shown in FIG. 10, band pass filter 214 is implement using inductors L605, L606, L607, and capacitors C619–C621. Band pass filter 214 is used to eliminate harmonic and spurious frequency components generated by the RF oscillator and the RF amplifiers. In one embodiment of the invention, L605 is a variable inductor. In one embodiment of the invention, this filter is used to comply with the FCC rules such as FCC rules part 15 for radio frequency transmission and radiation, and FCC rules part 68 for telephone equipment. In other embodiments of the invention, notch filters, band reject filters, or other types of filters are used in place of the band pass filter.

Microcontroller 28 is implemented using a PIC Micro Devices microcontroller such as the PIC16C55A or the like. The microcontroller is used as a system controller. The microcontroller is programmed as discussed herein. In a preferred embodiment, a crystal resonator such as X601 is used to generate a 4 MHz clock frequency for microcontroller 28. The internal instruction cycle used with the microcontroller is preferably one microsecond. In one embodiment of the invention, an 8-pole DIP switch and pull up resistors are used for setting the security code. In another embodiment of the invention, a random number generator is used to set the security code. Microcontroller 28 is uses dual color LED LD601 to indicate system status. LED LD601 indicates the system status such that a first LED will be steadily on after power-on reset is complete and a second LED will be on steadily after successfully establishing a connection between the base unit and the remote unit. The first LED will be flashing at a rate of one flash per second when there has been an unsuccessful attempt to establish a connection between the base unit and the remote unit, and the second LED will be flashing at a rate of one flash per second when the base unit is in use by another remote unit.

Figure 11:
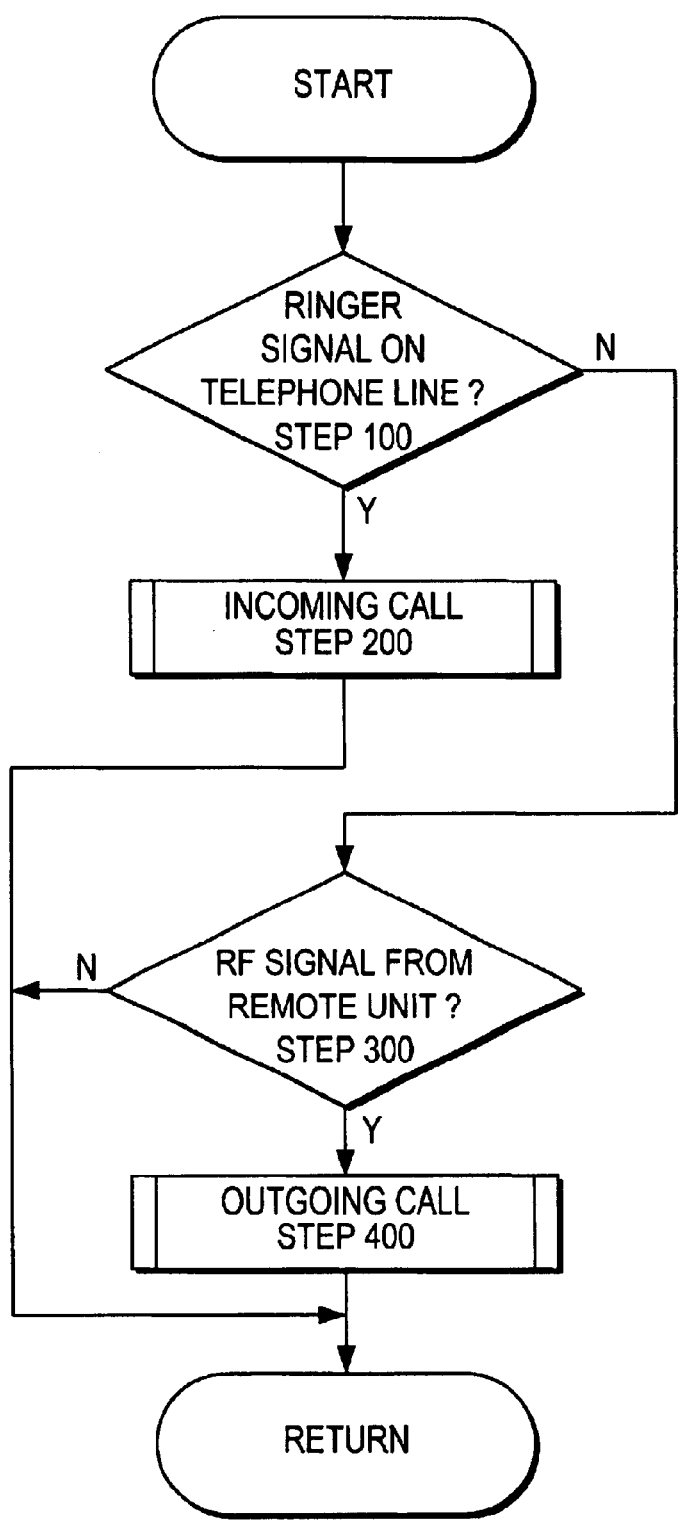
FIG. 11 is a flowchart of a process for determining an incoming or outgoing call at the base unit.
Figure 14:
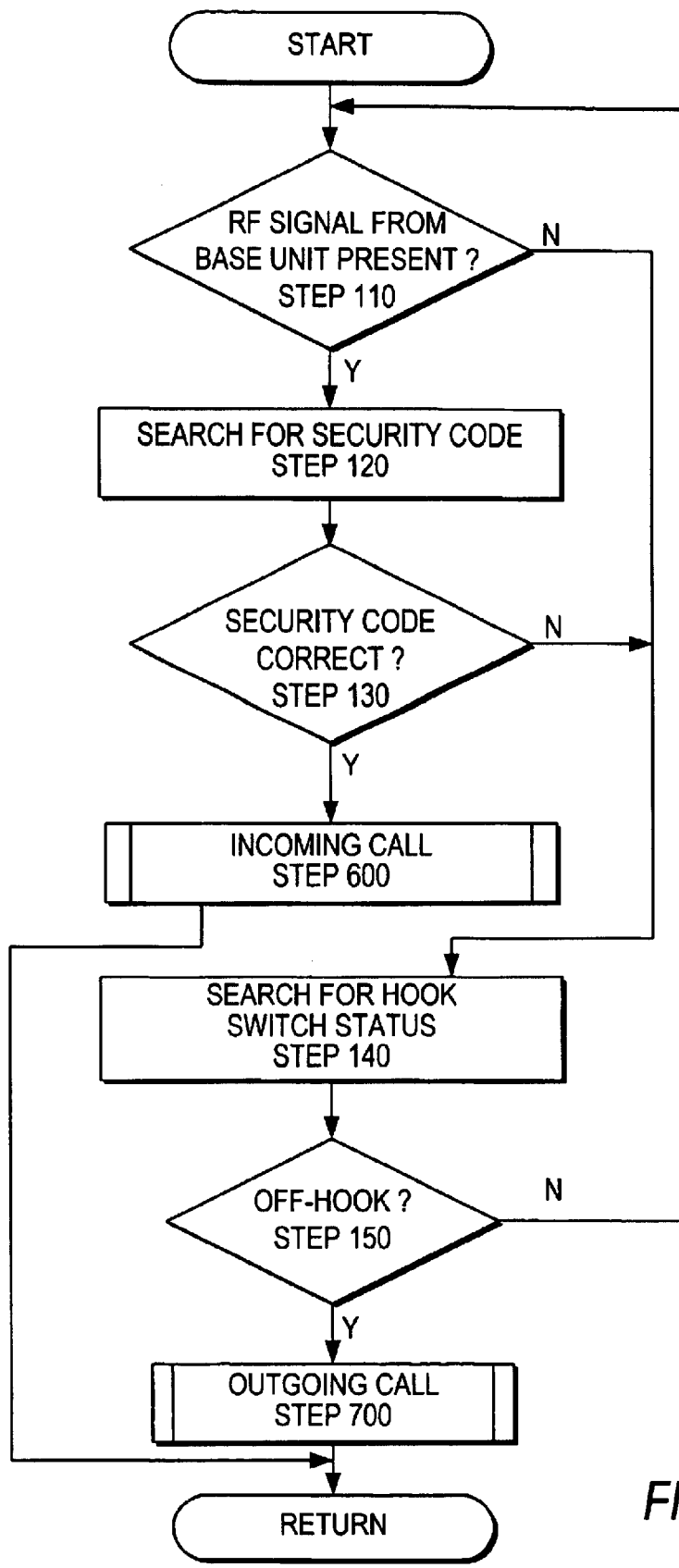
FIG. 14 is a flowchart of a process for determining an incoming or outgoing call at the remote unit.

As shown in FIG. 11, while the system is in stand-by state, the base unit is constantly searching for ringer signals present on the telephone line (step 100). If there is no ringer signal on the telephone line, the base unit searches for an RF signal from the remote units (step 300). Conversely, the remote unit is constantly searching for a hook switch from the telephone equipment or an RF signal from the base unit (FIG. 14). When a ringer signal is present on the telephone line, the base unit processes the incoming call (step 200). When an RF signal is being broadcast from a remote unit, the base unit processes the outgoing call (step 400). Steps 200 and 400 will be discussed in further detail with reference to FIG. 12.

Figure 12:
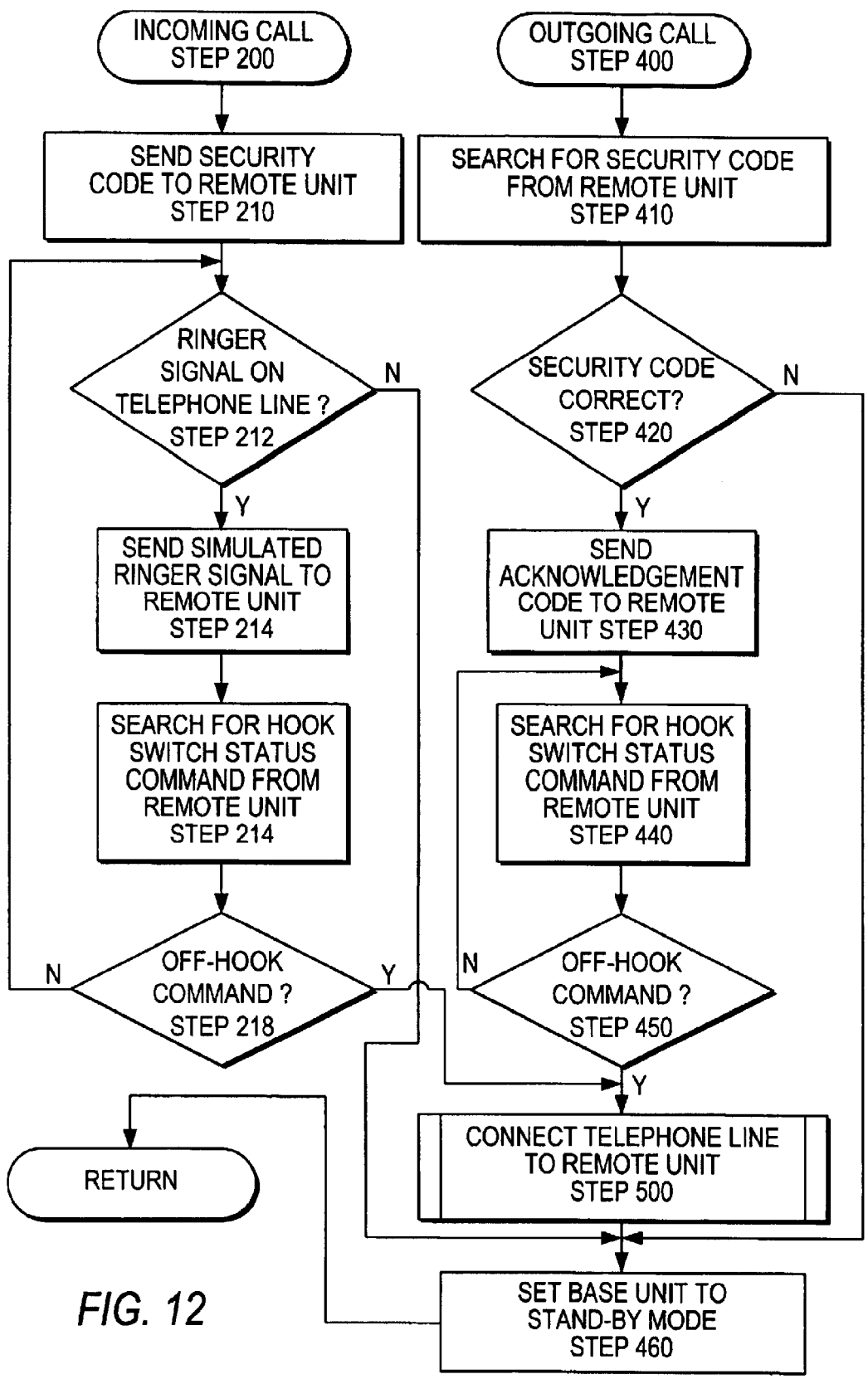
FIG. 12 is a flowchart showing a process of connecting an incoming or outgoing call at the base unit.

As shown in FIG. 12, after detecting a ringer signal on the telephone line (step 100, FIG. 11), the base unit transmits a security code to the remote units (step 210). The security code is verified as discussed below with reference to FIG. 17. In one embodiment, the base unit verifies that the ringer signal is still present on the telephone line (step 212), if the ringer signal is no longer present, i.e., the caller disconnected, the base unit returns to stand-by mode (step 460). The base unit transmits a simulated ringer system to all of the remote units via the AC power lines (step 214). After the ringer signal is transmitted, the base unit monitors the AC power lines for a hook switch status command from the remote units (step 216). When the base unit receives an off-hook command (step 218), the remote unit is connected to the telephone line (step 500). If no off-hook command is received, the base unit verifies that the ringer signal is still present on the telephone line. After the call is terminated, the base unit returns to stand-by mode.

As shown in FIG. 12, after detecting an RF signal on the AC power line (step 300, FIG. 11), the base unit searches for a security code from the remote unit (step 410). The security code is verified as discussed below with reference to FIG. 17. If the security code is correct (step 420), an acknowledgement code is transmitted to the remote unit (step 430), if the security code is incorrect, the base unit returns to stand-by mode (step 460). In one embodiment, the base unit searches for the hook switch status of the remote unit (step 440). If the base unit receives an off-hook status command from the remoter unit (step 450), the remote unit is connected to the telephone line (step 500). After the termination of the telephone call, the base unit returns to the stand-by mode (step 460).

Figure 13:
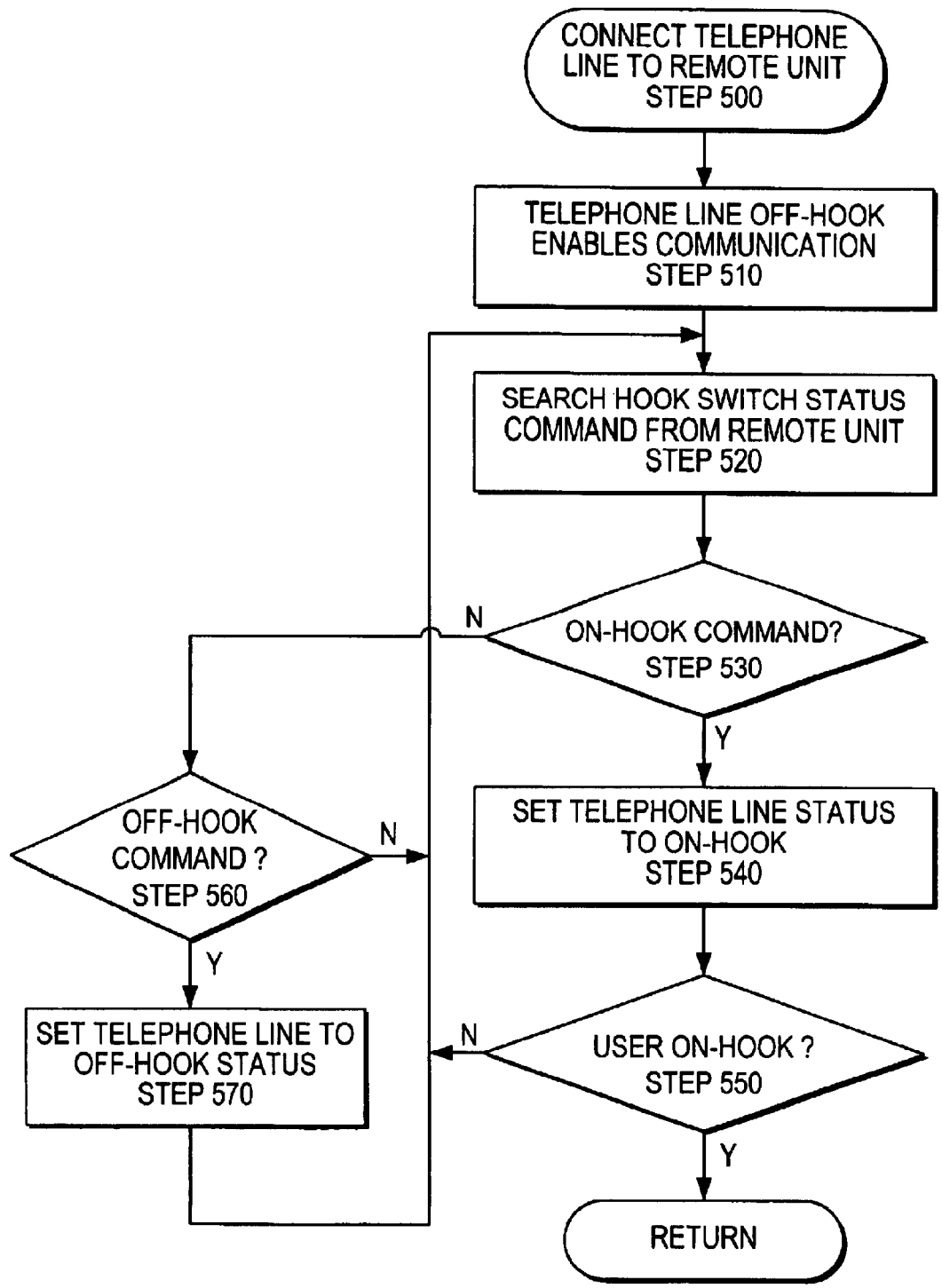
FIG. 13 is a flowchart of a process for changing hook status at the base unit.

FIG. 13 is a flowchart showing the process of monitoring hook status at the base unit. Initially, the remote unit connected to the telephone line (step 500). Communication is enabled when the remote unit is in the off-hook state (step 510). The base unit and the remote unit are transparent to the user once communication is initiated. The base unit continuously searches for a hook switch status command from the remote unit (step 520). If an on-hook status command is received, the telephone line status is set to on-hook, thereby allowing telephone calls to be received (step 540). If the remote unit does not transmit the on-hook command, the base unit continuously monitors the AC power lines for an on-hook command. When a first remote unit is connected to the base unit, other remote units monitor the hook switch status and send a command to the base unit each time their hook status changes. After the telephone equipment is disconnected from the telephone line, both base unit and remote unit enter a stand-by mode and terminate the communication link, as shown in FIGS. 12 and 13. In one embodiment of the invention, after 1.5 seconds in the on-hook state, the remote unit and base unit enter the stand-by mode.

As shown in FIG. 14, while the system is in stand-by state, the remote unit is constantly searching for RF signals present on the AC power line (step 110). If there is no RF signal on the AC power line, the remote unit searches for the equipment hook status (step 140). If the hook status is set as off-hook (step 150), the remote unit processes an outgoing call (step 700). When an RF signal is present on the AC power line, the remote unit searches for a security code from the base unit (step 120). The security code is then verified (step 130). If the security code is correct, the remote unit processes an incoming call (step 600). Steps 600 and 700 will be discussed in further detail with reference to FIG. 15.

Figure 15:
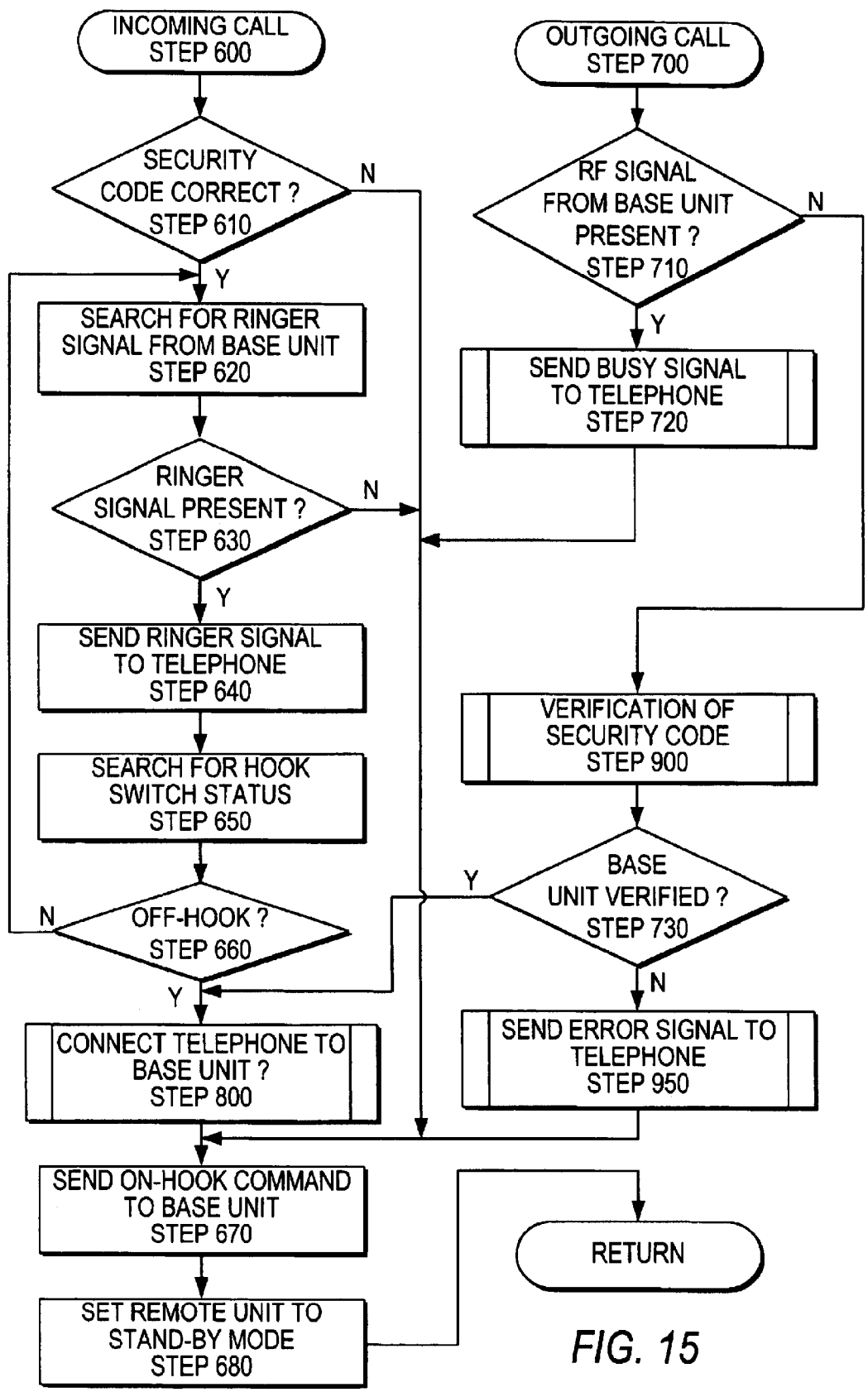
FIG. 15 is a flowchart of a process for connecting an incoming or outgoing call at the remote unit.

As shown in FIG. 15, when an incoming call is received the remote unit verifies the security code (step 610). If the security code is incorrect, the remote unit returns an on-hook command to the base unit (step 670) and the remote unit enters a stand-by mode (step 680). If the security code is correct, the remote unit verifies the presence of the ringer signal from the base unit (step 630). If the ringer signal is not present, the remote unit returns an on-hook command to the base unit (step 670) and the remote unit enters a stand-by mode (step 680). If the ringer signal is present, the remote unit transmits a ringer signal to the telephone equipment (step 640). The remote unit then determines the hook status (step 660) and connects the telephone equipment to the base unit (step 800).

Remote unit 16 processes outgoing calls by first determining if an RF signal is present from the base unit (step 710). If an RF signal is present, a busy signal is returned to the telephone equipment (step 720). If no RF signal is present from the base unit, the security code is verified (step 900). Once the base unit security code is verifies, the remote unit connects the telephone equipment to the base unit (step 800). If the base unit does not verify the security code, an error signal or busy signal is returned to the telephone equipment (step 950).

Figure 16:
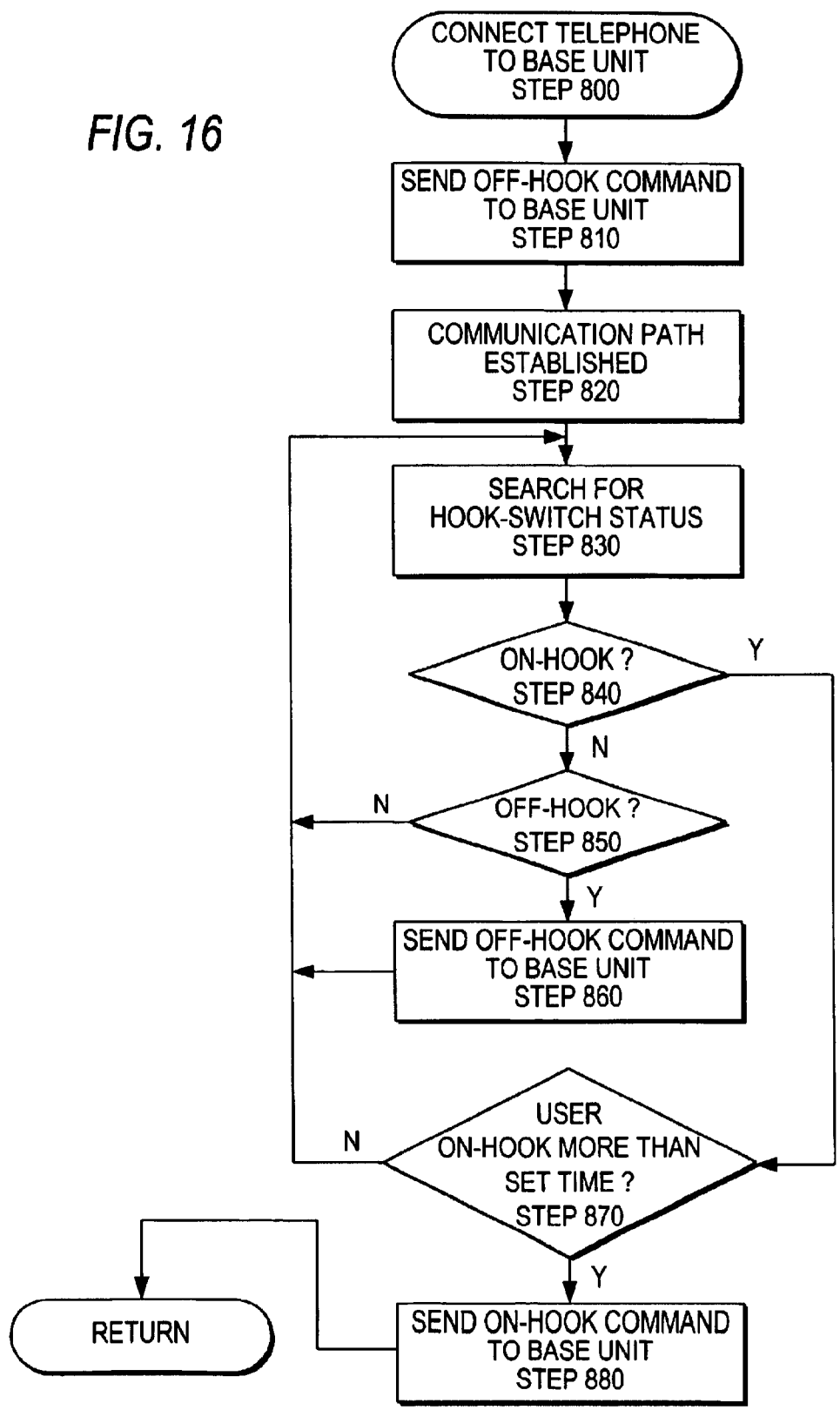
FIG. 16 is a flowchart showing a process of connecting telephone equipment to the base unit.

FIG. 16 is a flowchart showing the process for connecting telephone equipment to the base unit. Initially, an off-hook command is sent to the base unit by the remote unit (step 810). Next, a communication path is established (step 820). The remote unit continuously monitors hook status (step 830). If remote unit 16 receives an on-hook command (step 840), the remote unit determines if the telephone equipment has been on-hook for a preset time (step 870). If the preset time has been met, an on-hook command is transmitted to the base unit (step 880). The preset time allows the user to use such functions as flash without transmitting an on-hook command to the base unit. As long as the telephone equipment is off-hook, an off-hook command is transmitted to the base unit (step 860).

FIG. 17 shows a process for verification of the security code. In one embodiment, the security code is transmitted to the base unit by the remote unit (step 910). In response to receiving the security code, the base unit transmits an acknowledgement security code to the remote unit (step 920). In one embodiment, the security code and the acknowledgement code are the same. A preset time limit exists for the process to verify the security code. If the preset time limit is exceeded, the security code is retransmitted to the base unit. If after a set number of times no acknowledgement is received from the base unit, an error message is sent to the telephone equipment.

FIG. 18 shows a process for sending an error message to the telephone equipment. The remote unit 16 transmits an error message to the telephone equipment (step 960). In one embodiment of the invention, the error message is in the form of a busy signal. The remote unit then determines if the telephone equipment's hook status (step 980). The remote unit transmits the error message to the telephone equipment until the telephone equipment enters the on-hook state.

When a first remote unit enters the off-hook state, it will transmit a security code to the base unit. The base unit will verify the security code and send the security code back to the first remote unit if the correct security code is received. Once the verification process is completed, the base unit and the remote unit will be connected to the telephone line to establish a communication pass through. When the security code verification process is not successful, the remote unit will send an error signal to the telephone equipment until the user hangs up. Once the user hangs up the base unit will go into the stand-by state. In one embodiment of the invention, if the verification process is not completed within 5 seconds, the error message will be sent to the telephone equipment. When an RF signal is being transmitted from the base unit without a corresponding security code, this signifies that a first remote unit occupies the base unit. If telephone equipment 18 is activated at a second remote unit, the second remote unit will return a busy tone to the telephone equipment from the base unit.

When the system is idle, i.e. in stand-by state, the base unit is constantly searching for ringer signals from the telephone line as well as RF signals from remote units. When the base unit detects a ringer signal on the telephone line, the base unit will transmit a security code and simulated ringer signal to all remote units until one of the remote units goes to the off-hook state. The remote units will transmit the ringer signal to the telephone equipment, which is connected to each remote unit. Once the first piece of telephone equipment establishes a communication link between the remote unit and the base unit following a verification process, all other remote units will receive an off-hook signal.

Although the present invention was discussed in terms of certain preferred embodiments, the invention is not limited to such embodiments. Rather, the invention includes other embodiments including those apparent to a person of ordinary skill in the art. Thus, the scope of the invention should not be limited by the preceding description but should be ascertained by reference to the claims that follow.

What is claimed is:

1. A system for transmitting telephonic signals via AC power lines between a telephone line and telephone equipment having a ringer circuit comprising:

a base unit having a first transmitter, a first receiver section, a first power line interface, a first telephone line interface, a first power supply, and a first microcontroller;

said first telephone line interface adapted to be coupled to said telephone line to apply said telephonic signals to and receive signals from said telephone line, said telephone line interface having a ring detector, a first muting circuit, and a hook switch, said muting circuit muting said telephonic signals at least when a first security code is transmitted by said base unit;

said first transmitter coupled to said first telephone line interface and said first power line interface, said first transmitter having a first modulator, a first oscillator, a first amplifier, and a first filter;

said first receiver coupled said first telephone line interface and said first power line interface, said first receiver having a first filter, a first amplifier, and a first detector; and at least one remote unit having a second transmitter section, a second receiver, a second power line interface, a telephone interface, a second power supply, and a second microcontroller;

said telephone interface adapted to be coupled to said telephone equipment to transmit said telephonic signals to and receive said signals from said telephone equipment, said telephone interface having a ring generator, a tone generator, an anti-sidetone network, and an off-hook detector, said anti-sidetone network having a transistor, said transistor having a base, an emitter, and a collector;

a first resistor R1 connected in series with a second resistor R2, said first resistor connected to said emitter, said second resistor connected in series with a third resistor R3, said third resistor connected between said collector and said second resistor; and a fourth resistor R4 connected in series with said telephone equipment, said telephone equipment having an impedance Z, said fourth resistor and said telephone equipment connected between said collector and said emitter;

said second transmitter coupled to said telephone interface and said second power line interface, said second transmitter having a second modulator, a second oscillator, a second amplifier and a second filter; and said second receiver coupled said telephone interface and said second power line interface, said second receiver having a second filter, a second amplifier, and a second detector, said second power supply providing at least one power output capable of powering said ringer circuit in said telephone equipment.

2. The system for transmitting telephonic signals via AC power lines according to claim 1, wherein said anti-sidetone network is configured such that:

$$Z = (R4 \times R3)/(R1 - R2).$$

* * * * *